United States Patent
Kimura et al.

(10) Patent No.: US 7,376,962 B2
(45) Date of Patent: May 20, 2008

(54) DRIVING DEVICE FOR OBJECTIVE LENS AND OPTICAL PICK UP USING THE SAME

(75) Inventors: Katsuhiko Kimura, Chiyoda (JP); Junichi Senga, Yokohama (JP)

(73) Assignee: Hitachi Media Electronics Co., Ltd., Mizusawa-Shi (JP)

( * ) Notice: Subject to any disclaimer, the term of this patent is extended or adjusted under 35 U.S.C. 154(b) by 577 days.

(21) Appl. No.: 11/109,617

(22) Filed: Apr. 20, 2005

(65) Prior Publication Data

US 2006/0083121 A1 Apr. 20, 2006

(30) Foreign Application Priority Data

Oct. 20, 2004 (JP) .............................. 2004-305026

(51) Int. Cl.
*G11B 7/00* (2006.01)

(52) U.S. Cl. .................................. 720/683; 369/44.15

(58) Field of Classification Search ............... 720/681, 720/682, 683

See application file for complete search history.

(56) References Cited

U.S. PATENT DOCUMENTS

| 5,488,603 A * | 1/1996 | Tomita et al. ............... 720/683 |
| 6,825,999 B2 * | 11/2004 | Suzuki et al. ............... 359/824 |
| 7,107,602 B2 * | 9/2006 | Kimura et al. .............. 720/683 |
| 2003/0016597 A1 * | 1/2003 | Haruguchi et al. ...... 369/44.16 |
| 2005/0190662 A1 * | 9/2005 | Rosmalen ................ 369/44.15 |

FOREIGN PATENT DOCUMENTS

| JP | 2004-139699 | 5/2004 |
| JP | 2004-171662 | 6/2004 |

* cited by examiner

*Primary Examiner*—William Korzuch
*Assistant Examiner*—Peter Vincent Agustin
(74) *Attorney, Agent, or Firm*—Antonelli, Terry, Stout & Kraus, LLP.

(57) ABSTRACT

To reduce vibrations occurring in an objective lens driving apparatus there is provided an objective lens driving apparatus used in an optical pickup that reads/writes information from or onto an optical disk using an objective lens. The objective lens driving apparatus has a lens holder that holds an objective lens in a center part thereof, and a plurality of tracking coils that are disposed on both sides of the lens holder. The mass of a pair of first tracking coils that are disposed on one of the sides is greater than the mass of a pair of second tracking coils that are disposed on the other side.

5 Claims, 5 Drawing Sheets

DRIVING DEVICE FOR OBJECTIVE LENS AND OPTICAL PICK UP USING THE SAME

BACKGROUND OF THE INVENTION

The present invention relates to an optical pickup and an objective lens driving apparatus comprised by an optical disk apparatus that records or reproduces information onto or from an optical disk.

An example of an objective lens driving apparatus that is used in a conventional optical disk apparatus is described in JP-A-2004-171662 (p. 4, FIG. 1). In the objective lens driving apparatus disclosed in this publication, tracking coils and focusing coils that are driving coils are attached to a lens holder that holds an objective lens. Further, one end of supporting members that support a moving part is fixed to a fixed part, and the other end is fixed to the lens holder. Tracking coils are disposed near the center on one side of the moving part, and on the other side of the moving part tracking coils are disposed on the outside.

BRIEF SUMMARY OF THE INVENTION

In the objective lens driving apparatus disclosed in the above described JP-A-2004-171662, the supporting members that support the lens holder also serve a function of supplying current to each coil, and it is thus necessary for the supporting members to be electrically connected to the end of each coil by such as a solder. In that case, since it is preferable that the positions at which the lens holder is fixed to the supporting members are on a centerline of the lens holder, the connecting positions between each coil and the supporting members must be near the end of the supporting member on the side that is farther from the fixed part. As a result, the mass of a connecting member such as a solder is added to the side of the lens holder that is farther from the fixed part.

In order to make the optical disk apparatus smaller, and therefore to make the objective lens driving apparatus smaller and more lightweight, the influence of the mass of a connecting member such as a solder cannot be ignored. More specifically, there is a concern that the mass of a connecting member such as a solder may cause an unbalance in the mass of the moving part. If the mass of the moving part is unbalanced, when the objective lens is driven in a focusing direction or a tracking direction the center of gravity of the moving part and the center of the driving force become misaligned, whereby vibrations are generated in the moving part in rotation mode. When these vibrations occur, there is a concern that an oscillatory phenomenon will be occurred in the focusing control or tracking control, and it will be impossible to accurately record or reproduce information.

The present invention was made in consideration of the foregoing problem of the prior art. A purpose of this invention is to prevent or reduce the occurrence of vibrations in an objective lens driving apparatus. Another purpose of this invention is to accurately record and reproduce information onto or from an optical disk using an objective lens driving apparatus.

A feature of this invention which achieves the above described purposes is that, in an objective lens driving apparatus used in an optical pickup that reads/writes information from or onto an optical disk using an objective lens, the objective lens driving apparatus having a lens holder that holds an objective lens in a center part and a plurality of tracking coils that are disposed on both sides of the lens holder, the mass of a pair of first tracking coils that are disposed on one of the sides is greater than the mass of a pair of second tracking coils that are disposed on the other side.

Further, in this feature, the distance between the first tracking coils is preferably greater than the distance between the second tracking coils, and further preferably, a pair of first permanent magnets are disposed facing the first tracking coils and a pair of second permanent magnets are disposed facing the second tracking coils and the distance between the first permanent magnets is made less than the distance between the second permanent magnets. Preferably, focusing coils are also disposed at the ends of the lens holder and at positions where focusing coils sandwich the objective lens, and third permanent magnets are disposed within the focusing coils.

Another feature of this invention that achieves the above described purpose is that, in an objective lens driving apparatus having an objective lens that focuses a light on a recording side of an optical disk, a lens holder that holds an objective lens, focusing coils and a plurality of tracking coils that are attached to the lens holder, a fixed part for supporting the lens holder, supporting members that support a moving part including the lens holder in a condition in which it is capable of movement in a focusing direction and a tracking direction with respect to the fixed part, and permanent magnets that are disposed facing on both sides of the lens holder, the ends of the supporting members on the side opposite to the fixed part side are connected to terminals of the focusing coils and terminals of the tracking coils through connecting members, at least two of the tracking coils are disposed at both ends of the lens holder in the tracking direction on the side of the lens holder on which the fixed part is disposed and at least two of the tracking coils are disposed near the center of the lens holder in the tracking direction on the side of the lens holder that is opposite to the side on which the fixed part is disposed.

Further, in this feature, preferably the mass of the tracking coils on the fixed part side is greater than the mass of the tracking coils on the side opposite to the fixed part side and the connecting members are solders, and the permanent magnets may comprise first permanent magnets that face the tracking coils on the fixed part side and second permanent magnets that face the tracking coils on the side opposite to the fixed part side, and the space between the first permanent magnets and the tracking coils facing the first permanent magnets may be greater than the space between the second permanent magnets and the tracking coils facing the second permanent magnets. Further, inner yokes may be disposed on both sides of the objective lens in the tracking direction and a notch may be formed in an upper center part of the inner yokes.

A further feature of this invention that achieves the aforementioned purposes is that an optical pickup having a laser light emitting device and a light sensitive detector that receives reflected light from an optical disk comprises an objective lens driving apparatus that has any of the foregoing features.

According to this invention, since moments that are generated by connecting members that connect supporting members and coils of an objective lens driving apparatus are balanced, the occurrence of moments that cause the objective lens driving apparatus to rotate can be prevented or reduced even when the objective lens driving apparatus is moved in a tracking direction and a focusing direction. As a result, the occurrence of vibrations in the objective lens driving apparatus can be prevented or reduced, thus enabling accurate recording or reproduction of information onto or from an optical disk using the objective lens driving apparatus.

Other objects, features and advantages of the invention will become apparent from the following description of the embodiments of the invention taken in conjunction with the accompanying drawings.

DETAILED DESCRIPTION OF THE INVENTION

Figure 1:
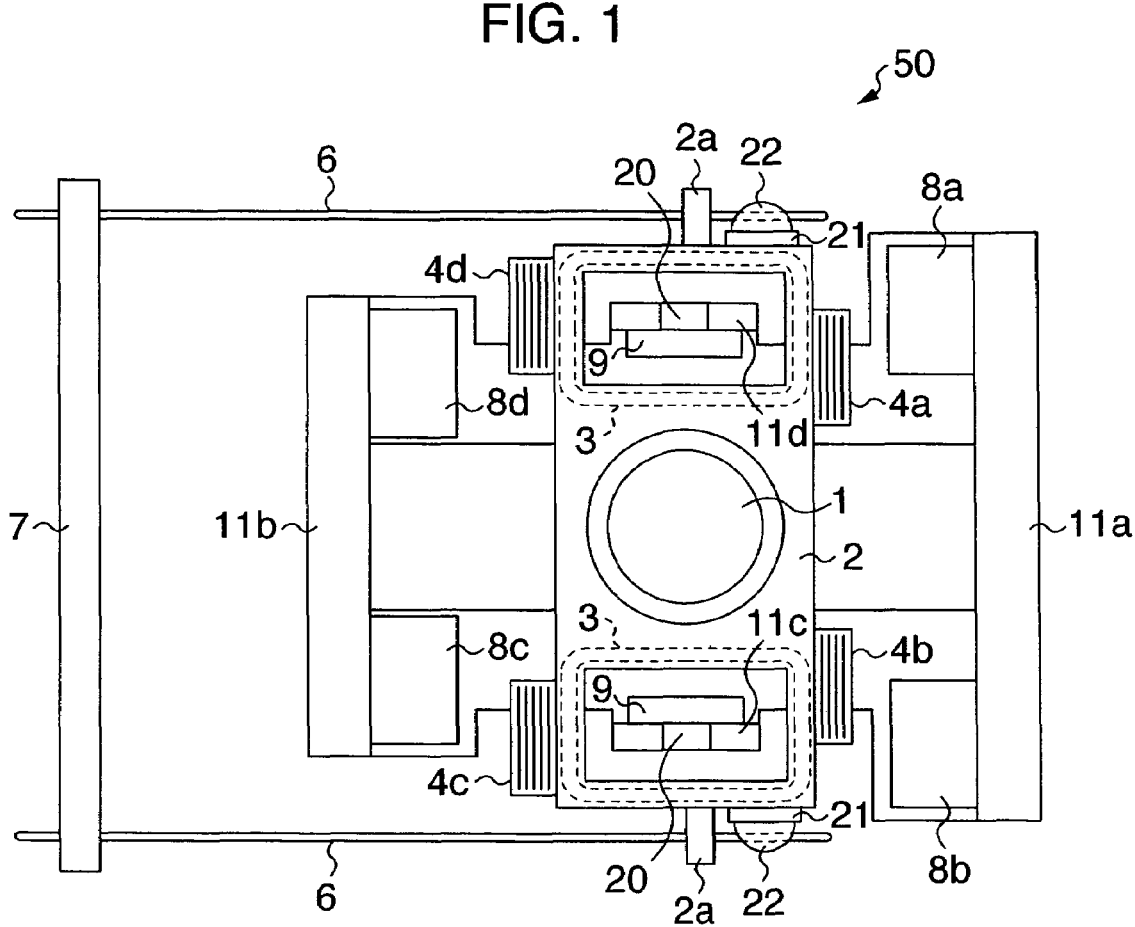
FIG. 1 is a top view of one embodiment of the objective lens driving apparatus of this invention.

Hereunder, one embodiment of the optical pickup of this invention is described referring to FIG. 1 to FIG. 5. First, an optical disk apparatus 100 on which is mounted an optical pickup 110 is explained using the block diagram of FIG. 5. The optical disk apparatus 100 has a spindle motor 120 for rotating an optical disk 101. The optical pickup 110 reads/writes information from or onto the optical disk 101. The spindle motor 120 and optical pickup 110 are controlled by a controller 130. On the optical pickup 110 are mounted optical components such as a laser light emitting device 111 and an objective lens driving apparatus that is described in detail later.

A disk rotation control circuit 131 is connected to the controller 130. When a command is input from the controller 130, the disk rotation control circuit 131 executes driving to rotate the spindle motor 120 on which the optical disk 101 is mounted. A travel control circuit 132 is also connected to the controller 130. In response to a command signal from the controller 130, the travel control circuit 132 moves the optical pickup 110 in the radial direction of the optical disk 101.

A light emitting device drive circuit 133 is connected to the laser light emitting device 111 that is mounted on the optical pickup 110. In response to a command signal from the controller 130, the light emitting device drive circuit 133 sends a driving signal to the laser light emitting device 111. When the driving signal is input, the laser light emitting device 111 emits a laser beam. The objective lens 1 focuses the laser beam onto the optical disk 101. The focused laser beam is reflected by the optical disk 101 and passes through the objective lens 1 to be incident on a light sensitive detector 112. A detection signal 134 that was obtained through processing at the light sensitive detector 112 is sent to a servo signal detection circuit 135 and a reproduction signal detection circuit 137. Based on the detection signal 134 that was input into the servo signal detection circuit 135, a servo signal is generated to be input into an actuator drive circuit 136.

Figure 5:
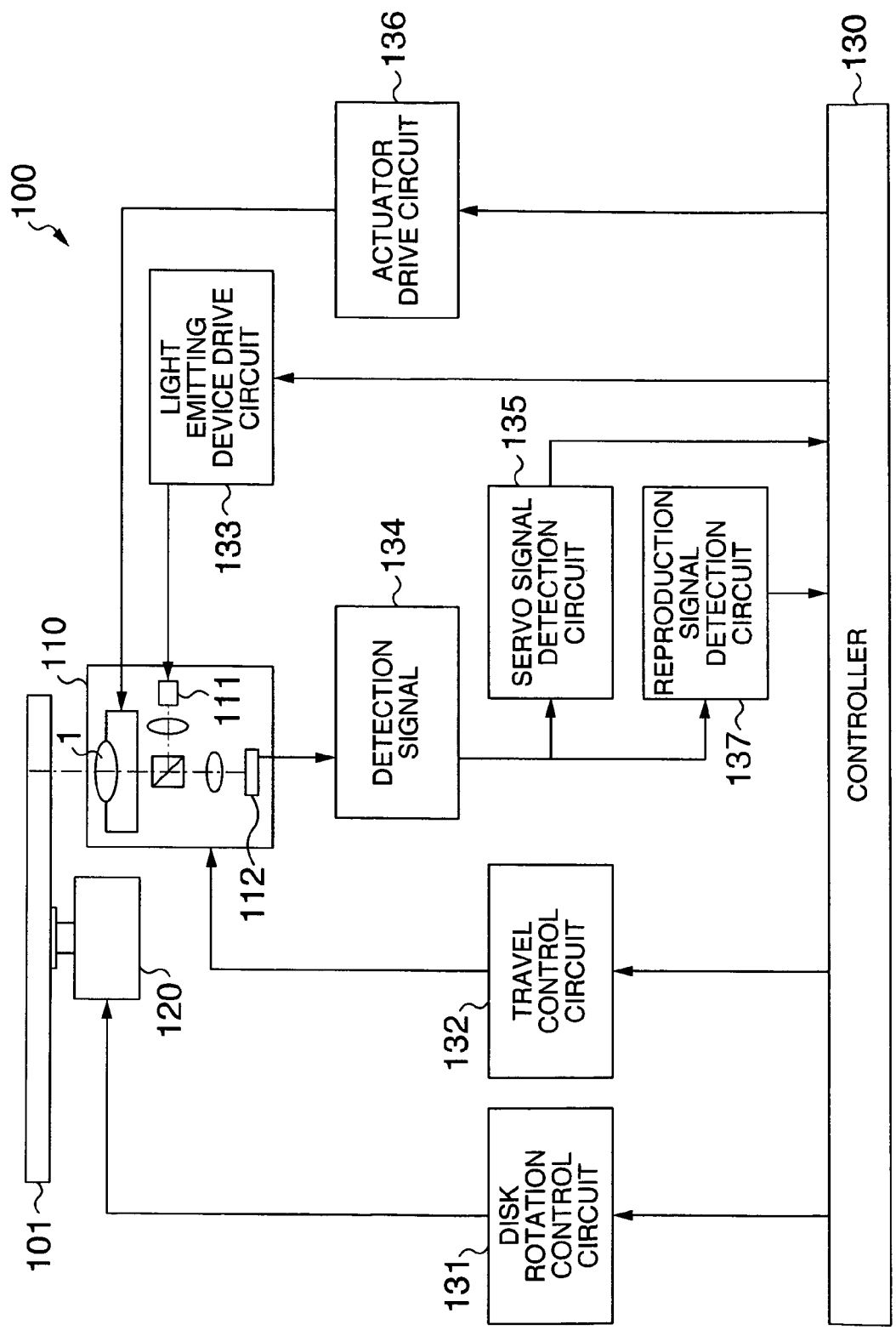
FIG. 5 is a block diagram of one embodiment of the optical disk apparatus of this invention.

The actuator drive circuit 136 inputs a driving signal into an objective lens driving apparatus (not shown in the figure) of the optical pickup 110 to carry out positioning control of objective lens 1. Meanwhile, a reproduction signal is generated in the reproduction signal detection circuit 137 based on the detection signal 134 that was input into the reproduction signal detection circuit 137, whereby information on the optical disk 101 is reproduced. The objective lens driving apparatus of the optical pickup 110 illustrated in FIG. 5 is described in detail hereunder.

Figure 2:
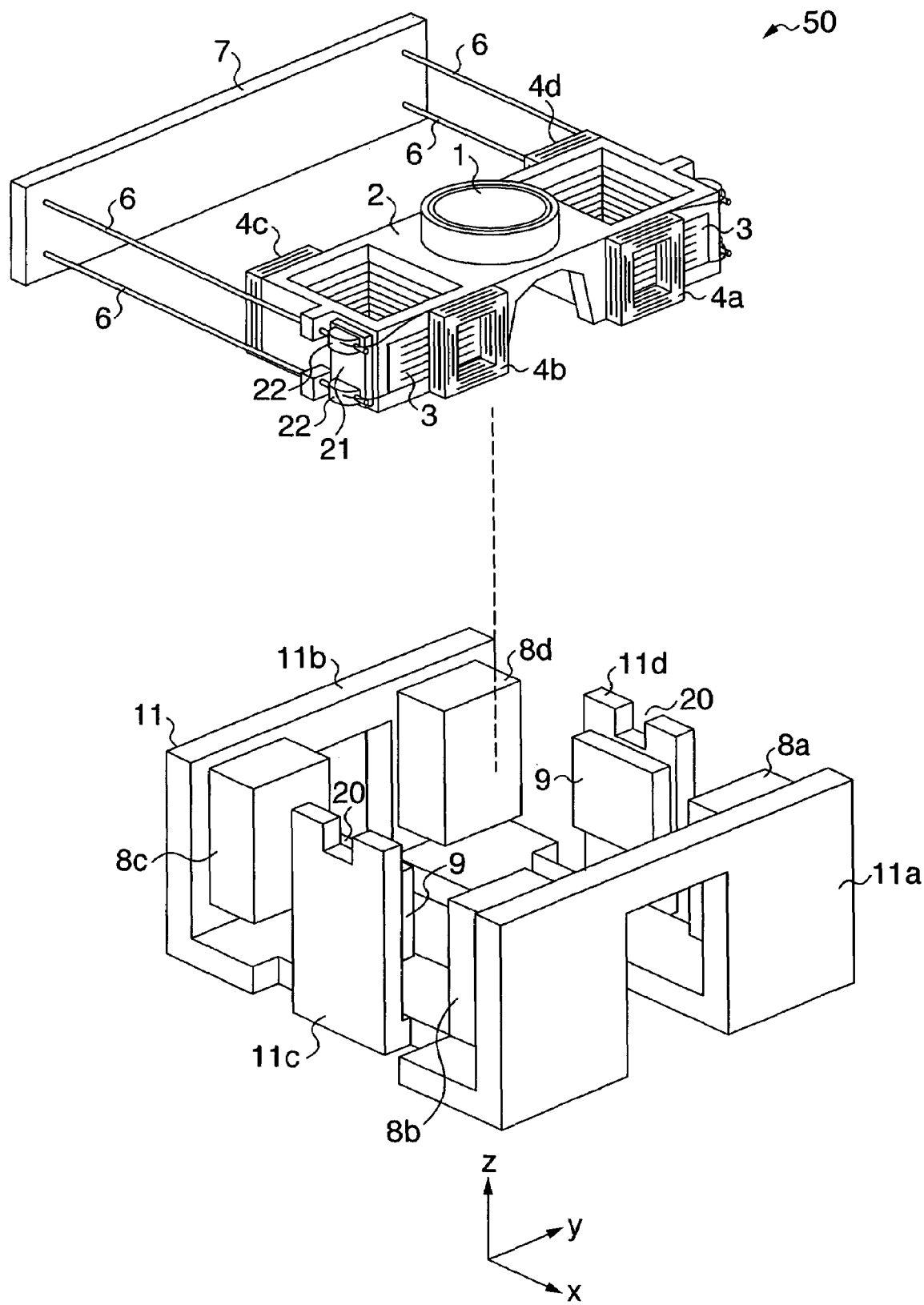
FIG. 2 is an exploded perspective view of the objective lens driving apparatus shown in FIG. 1.

FIG. 1 is a top view of an objective lens driving apparatus 50, and FIG. 2 is an exploded perspective view thereof. A direction "z" represents the direction (focusing direction) in which the objective lens 1 is moved close to or away from the surface of an optical disk, and a direction "y" represents the radial direction of the optical disk (tracking direction). The direction that is perpendicular to both the y direction and z direction is represented by a direction "x".

In a roughly central part of the objective lens driving apparatus 50 is disposed the objective lens 1 for reading/writing information from and onto an optical disk that is not shown in the figure. A lens holder 2 holds the objective lens 1 in the center of the top surface thereof. A moving part that has the lens holder 2 and the objective lens 1 is supported on a fixed part 7 by supporting members 6.

Focusing coils 3 are disposed at both ends of the lens holder 2 in a condition sandwiching the objective lens 1 in the y direction. Tracking coils 4a-4d are attached to both the left and right sides (the two sides in the x direction) of the lens holder 2, with spaces provided respectively therebetween. The tracking coils 4a-4d are disposed as described hereafter. On the side (the left side in the figure) of the lens holder 2 that is nearer to the fixed part 7, two tracking coils 4c and 4d are disposed at the two ends of the lens holder 2 in the y direction. On the side (the right side in the figure) of the lens holder 2 that is farther from the fixed part 7, two tracking coils 4a and 4b are disposed towards the center of the lens holder 2 in the y direction.

More specifically, on the left side of the lens holder 2 the distance between the tracking coils 4c and 4d is long, and on the right side of the lens holder 2 the distance between the tracking coils 4a and 4b is short. Also, the mass of the tracking coils 4c and 4d that are disposed on the side (left side) that is nearer to the fixed part 7 is greater than the mass of the tracking coils 4a and 4b that are disposed on the side (right side) that is farther from the fixed part. In order to increase the mass, the number of turns of the coils may be increased to gain the length of the coil wire, or a coil wire with a thick diameter may be used.

The supporting members 6 are positioned at the two outer sides of the lens holder 2 in the y direction, and one end of each of the supporting members 6 is fixed to the fixed part 7. The other end of each of the supporting members 6 is fixed to respective protruding parts 2a of the lens holder 2. The ends of the supporting members 6 on the lens holder 2 side, and the terminals of the focusing coils 3 and the tracking coils 4a-4d are connected through electrically conductive connecting members 22 such as a solder to connecting substrates 21 that are attached at the two outer sides of the lens holder 2 in the y direction (the vertical direction in the figure). The supporting members 6 are electrically conductive, and current is supplied to the focusing coils 3 and tracking coils 4a-4d through the supporting members 6.

At the ends of the moving part in the x direction (the horizontal direction in the figure) are disposed a pair of outer yokes 11a and 11b that extend in the y direction (the vertical direction in the figure). On the inner sides of the outer yokes 11a and 11b, single pairs of permanent magnets 8a-8d are respectively disposed in a condition in which they are separated from each other. On the inner sides of the focusing coils 3, inner yokes 11c and 11d are disposed in a condition extending in the x direction at positions that are roughly perpendicular to the outer yokes 11a and 11b. The inner yokes 11c and 11d are formed by bending edges protruding from a bottom plate part of a yoke member 11. Permanent magnets 9 are disposed in a condition adjoining the inner sides of the inner yokes 11c and 11d. The yokes 11a-11d and the permanent magnets 8a-8d and 9 form a magnetic circuit.

In this connection, since the supporting members 6 and the respective terminals of the focusing coils 3 and the tracking coils 4a-4d are connected at the side of the lens holder 2 that is opposite to the fixed part 7 side (the end on the right side in the figure), the masses of the connecting substrates 21 and the electrically conductive connecting members 22 cannot be ignored as moment loads. More specifically, since these masses are on the side of the lens holder 2 that is farther from the fixed part 7 in the x direction, and with respect to the y direction, the outer side of the lens holder 2 in the y direction, they act as moment loads around the x-axis. In this case, when the distance in the y direction between the tracking coils 4a and 4b is the same as the distance between the tracking coils 4c and 4d, the mass balance of the moving part is disturbed by the masses of the connecting substrates 21 and the electrically conductive connecting members 22.

Thus, in this embodiment the mass balance is designed according to the method described hereafter. That is, the tracking coils 4a and 4b that are attached at the side of the lens holder 2 that is opposite to the fixed part 7 side are disposed at a more central site in the y direction than the tracking coils 4c and 4d that are attached at the side of the lens holder 2 that is on the fixed part 7 side. As a result, it is possible to balance moments around the x-axis that occur when the coordinate axis is set at the center of the objective lens 1. Further, since the mass of the tracking coils 4c and 4d that are attached at the side of lens holder 2 that is on the fixed part 7 side is made greater than the mass of the tracking coils 4a and 4b that are attached at the side of the lens holder 2 that is opposite to the fixed part 7 side, it is possible to balance moments around the y-axis.

In this connection, the mass balance in the y direction or in the x direction is improved by adopting a configuration in which the distance in the y direction between the former tracking coils 4a and 4b is made shorter than the distance in the y direction between the tracking coils 4c and 4d, or in which the mass of the latter tracking coils 4c and 4d is made greater than the mass of the tracking coils 4a and 4b. In addition, when both of these are adopted the mass balance is improved in both the x direction and the y direction.

Figure 3:
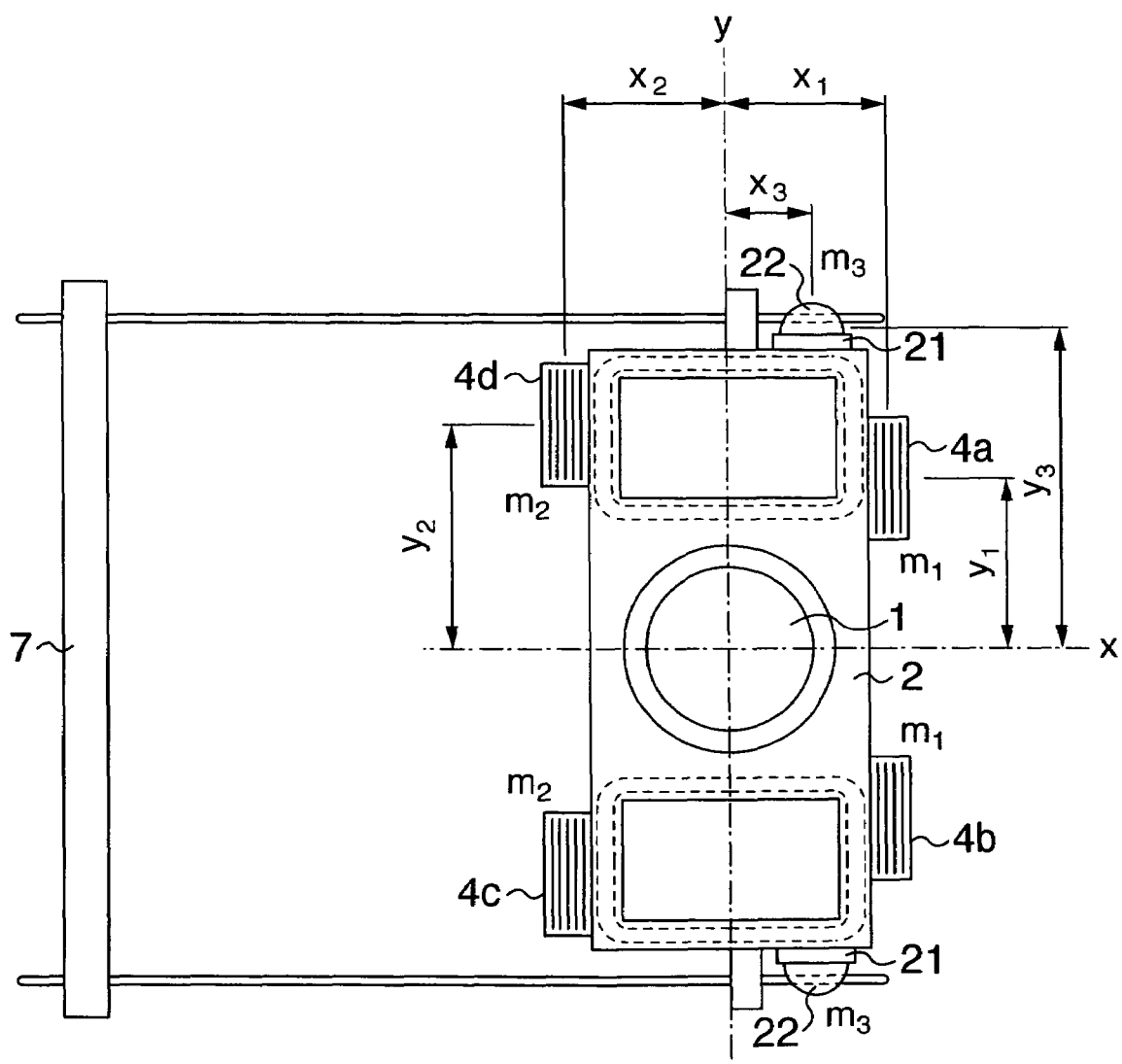
FIG. 3 is an explanatory drawing that describes the mass balance of the objective lens driving apparatus.

The mass balance will now by explained in detail using FIG. 3. In the figure, the mass of the tracking coils 4a and 4b that are attached at the side of the lens holder 2 that is opposite to the fixed part 7 side is denoted by $m_1$, the distance of these coils from the y-axis is denoted by $x_1$, the distance of these coils from the x-axis is denoted by $y_1$, the mass of the tracking coils 4c and 4d that are attached at the side of the lens holder 2 that is on the fixed part 7 side is denoted by $m_2$, the distance of these coils from the y-axis is denoted by $x_2$, the distance of these coils from the x-axis is denoted by $y_2$, the mass of the connecting substrates and the electrically conductive connecting members is denoted by $m_3$, the distance of these from the y-axis is denoted by $x_3$ and the distance of these from the x-axis is denoted by $y_3$.

The condition for mass balance around the x-axis when the origin of coordinates is set at the center of the objective lens 1 is:

$$m_1*y_1+m_3*y_3=m_2*y_2.$$

Likewise, the condition for mass balance around the y-axis is:

$$m_1*x_1+m_3*x_3=m_2*x_2.$$

For example, if it is taken that $x_1=x_2$, $x_3=0.5x_1$, $y_3=1.3y_2$ and $m_3=0.5m_1$, then $m_1=0.8m_2$ and $y_1=0.6y_2$. Accordingly, the mass and positioning of each of the tracking coils 4a-4d can be decided so as to yield these values.

In this connection, when the number of turns of the tracking coils 4c and 4d that are attached on the fixed part 7 side is made greater than the number of turns of the tracking coils 4a and 4b that are attached on the side opposite to the fixed part 7 side, in order to make the mass of the tracking coils 4c and 4d greater than the mass of the tracking coils 4a and 4b, under conditions in which the sizes of magnetic flux densities acting on the tracking coils 4a-4d are the same, a driving force generated at the tracking coils 4c and 4d is larger than a driving force generated at the tracking coils 4a and 4b, resulting in an unbalance in the driving force.

Figure 4:
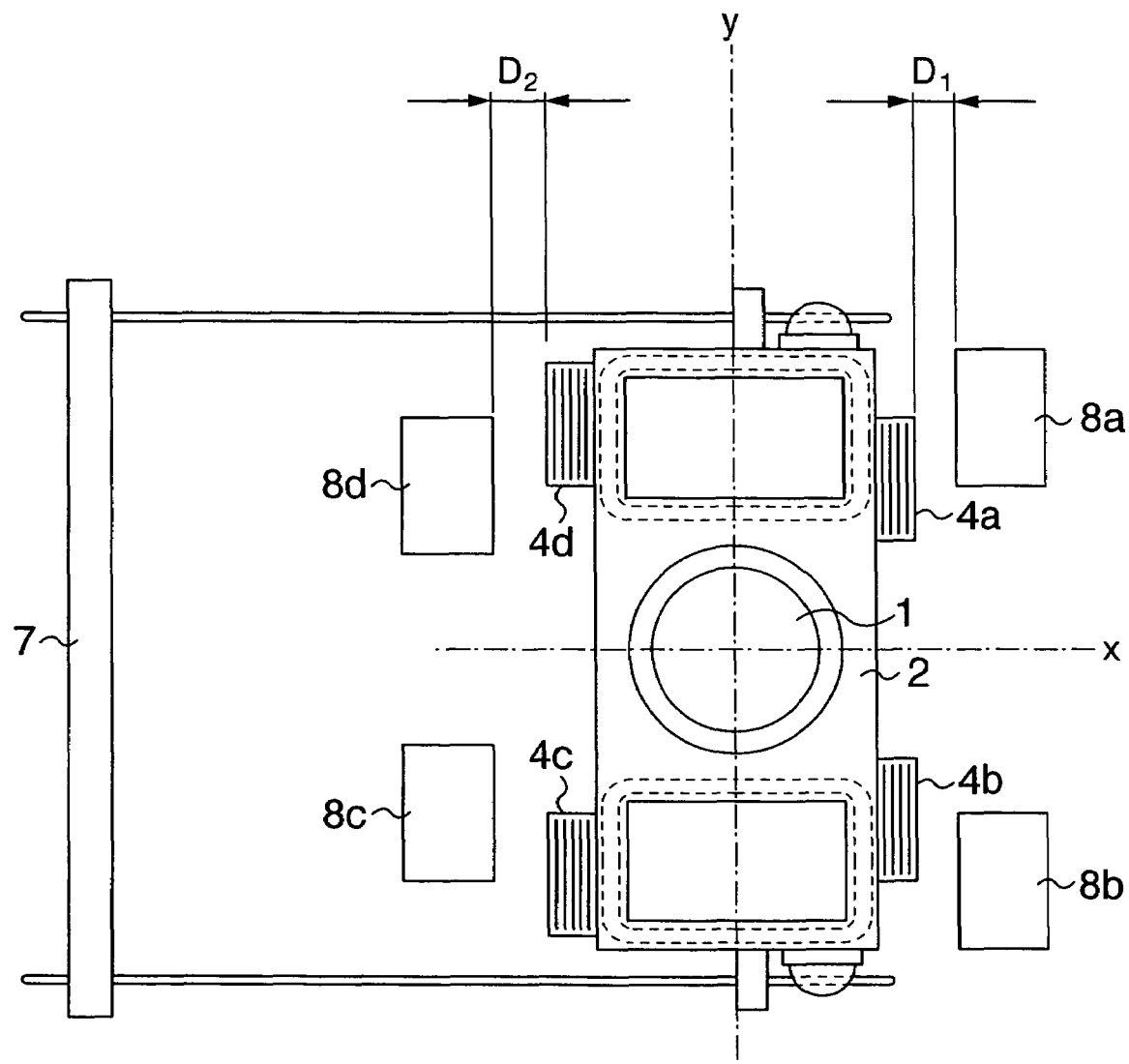
FIG. 4 is an explanatory drawing that describes the disposition of permanent magnets in the objective lens driving apparatus shown in FIG. 1.

Therefore, as shown in FIG. 4, in this embodiment a space $D_2$ between the tracking coils 4c and 4d on the fixed part 7 side and the permanent magnets 8c and 8d that face these coils is made wider than a space $D_1$ between the tracking coils 4a and 4b on the side opposite to the fixed part 7 side and the permanent magnets 8a and 8b that face these coils. Thus, the magnetic flux density acting on the tracking coils 4c and 4d on the fixed part 7 side decreases, whereby a difference in driving force generated between the tracking coils 4c and 4d on the fixed part 7 side and the tracking coils 4a and 4b on the side opposite to the fixed part 7 side can be reduced.

Accordingly, when making the number of turns of the tracking coils 4c and 4d greater than the number of turns of the tracking coils 4a and 4b to make the mass of the tracking coils 4c and 4d greater than the mass of the tracking coils 4a and 4b, both the mass balance and driving force balance can be enhanced by making the space between the tracking coils 4c and 4d on the fixed part 7 side and the permanent magnets 8c and 8d wider than the space between the tracking coils 4a and 4b on the side opposite to the fixed part 7 side and the permanent magnets 8a and 8b. In the above described embodiment, although the magnetic flux density acting on the tracking coils 4c and 4d on the fixed part 7 side is changed by varying the distance between the tracking coils 4c and 4d and the permanent magnets facing these tracking coils, the magnetic flux density may also be changed by making the dimensions of the permanent magnets 8c and 8d on the fixed part 7 side smaller than the dimensions of the permanent magnets 8a and 8b on the side opposite to the fixed part 7 side, or making the magnetic force of the permanent magnets 8c and 8d on the fixed part 7 side smaller than the magnetic force of the permanent magnets 8a and 8b on the side opposite to the fixed part 7 side.

In this connection, in general, vibration characteristics of the objective lens driving apparatus 50 are measured by irradiating a laser beam onto the objective lens 1 as the measurement target and detecting the reflected light. When measuring the vibration characteristics for the tracking direction, a laser beam is irradiated onto the objective lens 1 from the y direction. In this case, since the vibration characteristics cannot be measured when the objective lens 1 is shielded by the inner yokes 11c and 11d in view of the y direction, it is necessary to attach to the lens holder 2 a reflecting member for measurement use that has a reflecting surface in a position that is higher than the height in the z direction of the inner yokes 11c and 11d. Further, when the height of the inner yokes 11c and 11d is lowered overall to prevent shielding of a laser beam for measurement, the magnetic flux from the permanent magnets 8a-8d flows in a downward direction, whereby the distribution of the magnetic flux density in the z direction is asymmetrical.

In this embodiment, a notch 20 is formed in an upper center part of the inner yokes 11c and 11d to secure an optical path through which a laser beam from an external part in the y direction of the objective lens driving apparatus 50 passes to reach the objective lens 1. As a result, it is not necessary to provide a reflecting member only for measurement use as an additional part, and the vibration characteristics of the objective lens driving apparatus 50 in the tracking direction can be easily measured. Further, since the height of the inner yokes 11c and 11d can be made higher than the height of the upper edges of the permanent magnets 8a-8d, the magnetic flux density distribution in the z direction can be brought close to a symmetric distribution.

According to the above described embodiment, since the tracking coils are disposed at a central site in the tracking direction on the side opposite to the fixed part side of the lens holder on which connecting members are disposed, and the tracking coils are disposed at both ends in the tracking direction on the fixed part side, the mass balance is enhanced in the tracking direction. Since the mass of the tracking coils on the fixed part side is made greater than the mass of the tracking coils on the side opposite to the fixed part side, the mass balance is enhanced in a direction perpendicular to both the tracking direction and the focusing direction. As a result, the objective lens driving apparatus has an excellent mass balance and the occurrence of vibrations is reduced, thus enabling the accurate recording or accurate reproduction of information onto or from an optical disk.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An objective lens driving apparatus, comprising:
an objective lens;
a lens holder that holds the objective lens;
focusing coils and tracking coils attached to the lens holder; and
supporting members that support the lens holder with respect to a fixed part;
wherein the supporting members are connected to the focusing coils and the tracking coils by electrically conductive connecting members positioned at a side farther from the fixed part with respect to a center of the lens holder;
wherein a distance between two of the tracking coils attached to a side nearer to the fixed part with respect to the center of the lens holder is greater than a distance between two of the tracking coils attached to a side farther from the fixed part with respect to the center of the lens holder; and
wherein a mass of the tracking coils attached to the side nearer to the fixed part with respect to the center of the lens holder is greater than a mass of the tracking coils attached to the side farther from the fixed part with respect to the center of the lens holder.

2. The objective lens driving apparatus according to claim 1, wherein a distance between the tracking coils and permanent magnets attached to the side nearer to the fixed part with respect to the center of the lens holder is greater than a distance between the tracking coils and permanent magnets attached to the side farther from the fixed part with respect to the center of the lens holder.

3. The objective lens driving apparatus according to claim 1, wherein the connecting members comprise solder.

4. The objective lens driving apparatus according to claim 1, wherein inner yokes are disposed on both sides of the objective lens in the tracking direction and a notch is formed in an upper center part of the inner yokes.

5. An optical pickup having a laser light emitting device and a light sensitive detector that receives reflected light from an optical disk, wherein the optical pickup comprises the objective lens driving apparatus according to claim 1.

* * * * *